Jan. 14, 1964    H. F. RAYMOND    3,117,329
RELEASING TAP AND DIE HOLDERS
Filed Jan. 13, 1961    3 Sheets-Sheet 1

INVENTOR
HUBERT F. RAYMOND
By Frederick E. Bromley
ATTY.

Jan. 14, 1964   H. F. RAYMOND   3,117,329
RELEASING TAP AND DIE HOLDERS
Filed Jan. 13, 1961   3 Sheets-Sheet 2

INVENTOR
HUBERT F. RAYMOND
By Frederick C. Bromley
Atty.

Jan. 14, 1964 H. F. RAYMOND 3,117,329
RELEASING TAP AND DIE HOLDERS
Filed Jan. 13, 1961 3 Sheets-Sheet 3
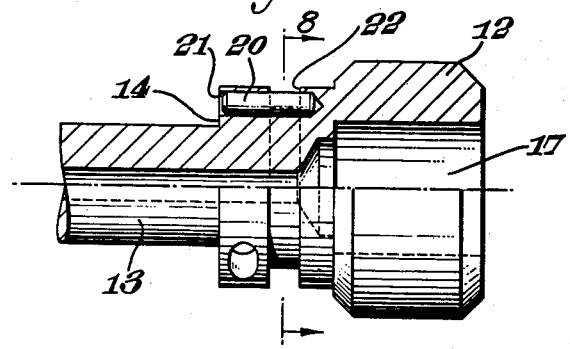
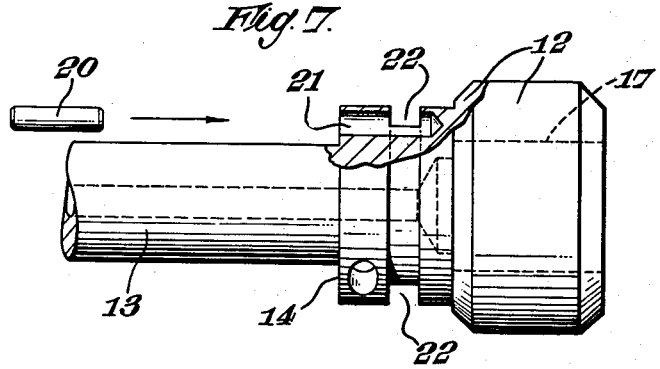
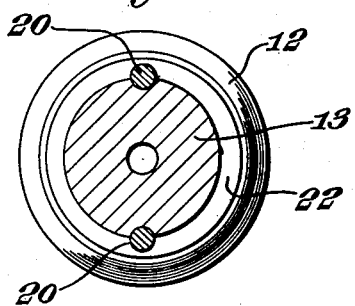
INVENTOR
HUBERT F. RAYMOND
By Frederick C. Bromley
ATTY.

United States Patent Office 3,117,329
Patented Jan. 14, 1964

3,117,329
RELEASING TAP AND DIE HOLDERS
Hubert F. Raymond, 47 Roxaline St., Weston,
Ontario, Canada
Filed Jan. 13, 1961, Ser. No. 82,544
Claims priority, application Great Britain Feb. 20, 1960
1 Claim. (Cl. 10—89)

The present invention relates to a releasing tap and die holder, adapted for use with an automatic screw and like machine capable of forming under accurate control threads in or on a workpiece to a required length or depth. The tap and die holder is of a kind which includes a clutch arranged to provide for a positive drive during the threading operation and to be disconnected when the threading of a workpiece up to a desired length or depth has been attained.

It is already known in the art to provide a releasable tap and die holder in which the clutch referred to is provided by diametrically opposite radial teeth on the exterior of a tool holder rotatably mounted in a hollow coaxial tool carrier, these teeth being provided on their opposite flanks with converging cam faces capable of cooperating with dogs mounted for radial sliding movement in a diametrically arranged guide formed in the said tool carrier.

Whilst a tap and die holder according to the said teachings of the related art has proved successful, it has been discovered that in practical use and as a result of stress concentration upon bringing the clutch into operation, rapid wear took place on the cam faces of the said teeth with the result that frequent servicing was required, or, alternatively, the holder on the exterior on which the teeth were integrally formed, had to be replaced in an early part of the life of the tap and die holder. The inventor has appreciated that this problem leads to unnecessary expense and delay in restoring the tap and die holder to its former state, and has devised a simple, reliable and inexpensive arrangement of clutch which enables the useful life of the tap and die holder to be prolonged.

In order that the invention may be thoroughly understood and readily carried into effect, a satisfactory form of construction of releasing tap holder according to the invention is illustrated, by way of example, on the accompanying drawings, wherein:

FIG. 6 is a sectional elevation of the tool holder and illustrating one of the rollers of the clutch in assembled position FIG. 7 is a view similar to FIG. 6 illustrating the tool holder prior to reception of the roller FIG. 8 is a section of FIG. 6 taken on the dotted line 8—8.

Figure 1:
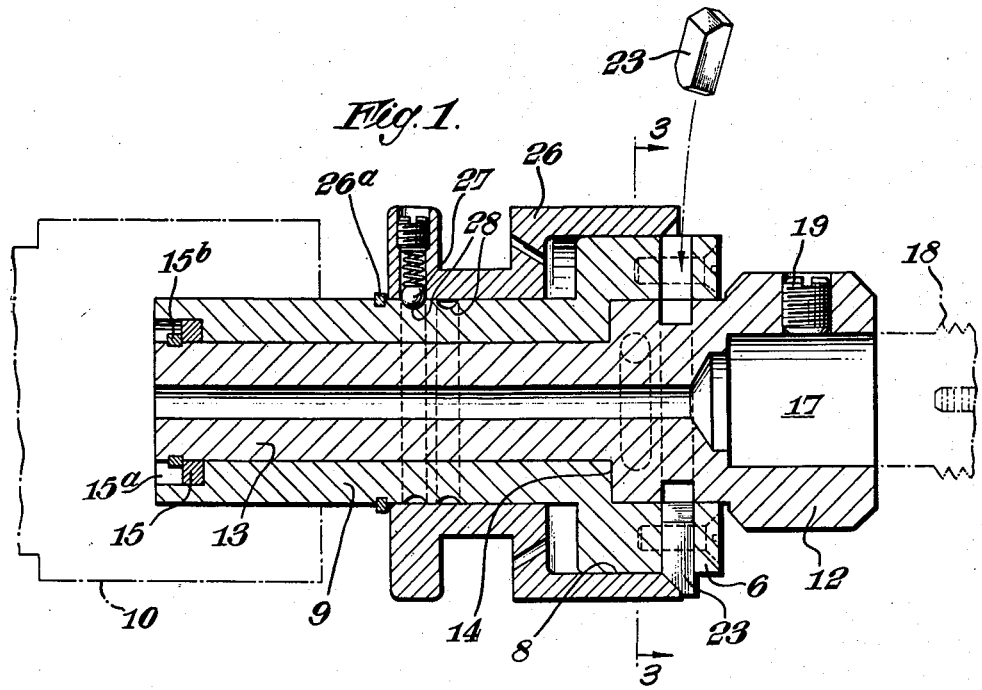
FIG. 1 is a longitudinal section of the tap holder with the clutch disengaged

As will be observed in the drawings, illustrating the releasing tap holder, there is provided a hollow carrier 6 of stepped construction comprising a socketed head having an outer annular wall 8, the tail part of the carrier 6 having a coaxially bored shank 9 of reduced diameter relative to the head, adapted to be rigidly secured in a chuck indicated at 10.

A tool holder 12 is axially assembled to the carrier 6 by means of a cylindrical stem 13 journalled in the tubular shank 9, the holder 12 including a thrust shoulder 14 which seats against a corresponding shoulder of the stepped carrier 6. The tool holder 12 is held in the carrier 6 against axial displacement by the combination of the shoulder 14 and an abutment ring 15 located in a recess 15a in a counterbored end of the carrier 6 and held in position by a split retaining ring 15b contracted on the stem 13. The outer end of the tool holder 12 has an axial socket 17 for reception of the shank of a tool, such as a tap indicated at 18, and is retained by a grub screw 19.

A clutch for coupling the tool holder 12 to the carrier 6 comprises at least two or more hard rollers 20 arranged in longitudinally directed pockets 21 set diametrically in the tool holder 12. These pockets 21 are drilled in the face of the shoulder 14 and receive the rollers 20 a loose fit in order that they may turn freely to present several peripheral areas for distribution of wear. The rollers 20 are held captive against longitudinal displacement, yet free to rotate, by the shoulder 14 abutting against the corresponding journal shoulder of the carrier 6; the outer wall of the pocket 21 is slotted at 22 and provides an annular groove in the periphery of the said tool holder 12. The groove 22 is designed for indexing with dogs 23 of rectangular section which are radially movable in corresponding guides arranged diametrically in the carrier 6.

The inner end of each dog 23 is bevelled at its opposite sides 24 for making a smooth engagement and disengagement with a roller 20. Displacement of the dogs towards the axis of tap holder is effected by means of a tubular shift collar 26 mounted for axial sliding movement on the shank 9 of the carrier 6, the mouth of the collar 26 being chamfered for engagement with an adjacent bevelled edge of each dog 23. The axial movement of the shift collar 26 in one direction is controlled by a split ring 26a contracted in a groove formed in the shank 9, and the indexing of the collar 26 into two predetermined positions is effected by a spring-loaded ball 27 on the collar 26 engaging circumferential grooves constituting detents 28 on the shank 9.

When the clutch is inoperative as seen in FIG. 1, the rollers 20 are idling since, by virtue of the retracted position of the shift collar 26, the dogs are unstressed.

Figure 2:
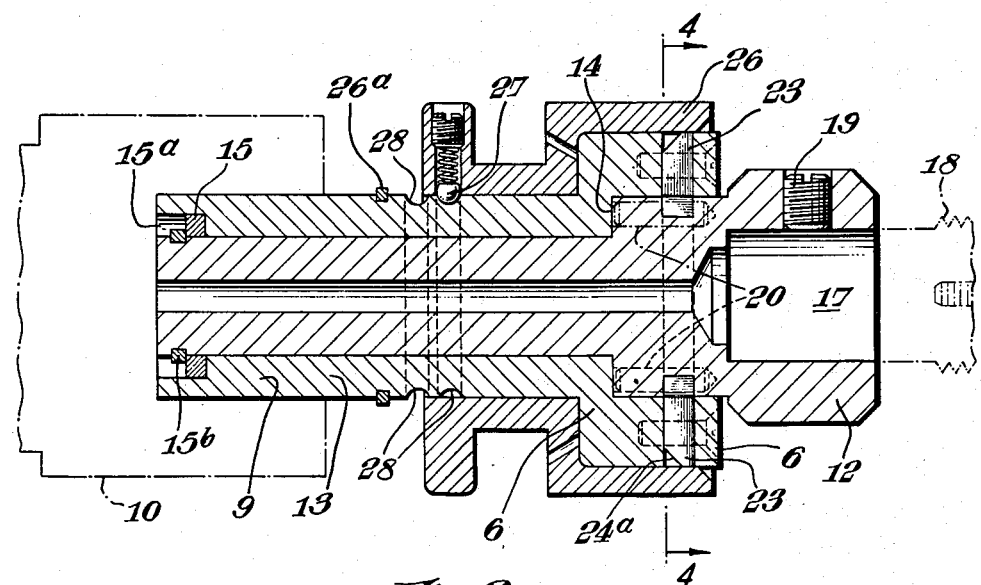
FIG. 2 is a longitudinal section similar to FIG. 1 illustrating the clutch engaged

When the collar is advanced as in FIG. 2, the chamfered mouth of the collar 26 engages the bevelled edges 24a of the dogs 23 and urges them diametrically towards the axis of the tap holder. Consequently, the inner thrusted ends of the dogs 23 exert a positive pressure on the rollers 20 and renders the clutch effective, thus driving the tool holder through the tool carrier 6.

In the use of my invention in an automatic screw machine for performing threading operations the releasing tap holder is advanced by the chuck 10 to start the tool in the work. The tool then feeds itself to complete the threading operation. When the threads have been cut to the desired point the release mechanism releases the tool so that it may turn with the work and thereby discontinue the threading operation. The release mechanism includes a yoke and trip rod (not shown) which are standard elements of an automatic screw machine, and the yoke is connected to the collar 26 by the annular collar thereof.

A conventional roll clutch then comes into action to lock the tool holder 12 to the chuck, and due to a speed differential between the chuck and the work-holding spindle the tool is caused to unscrew and disengage itself from the work. Whereupon the chuck and the tool are returned to retracted positions for threading the next piece of work.

Figure 3:
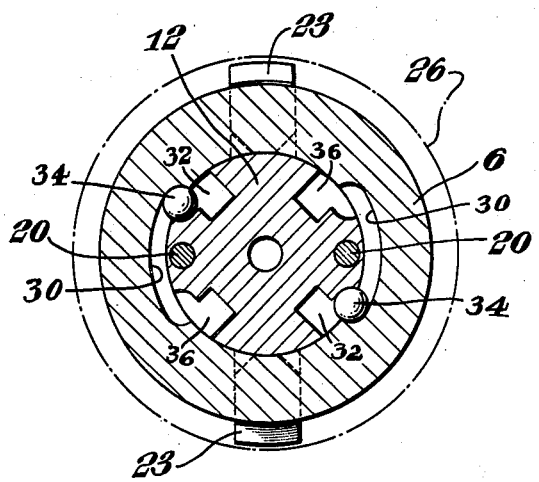
FIG. 3 is a section of FIG. 1 taken on the dotted line 3—3
Figure 4:
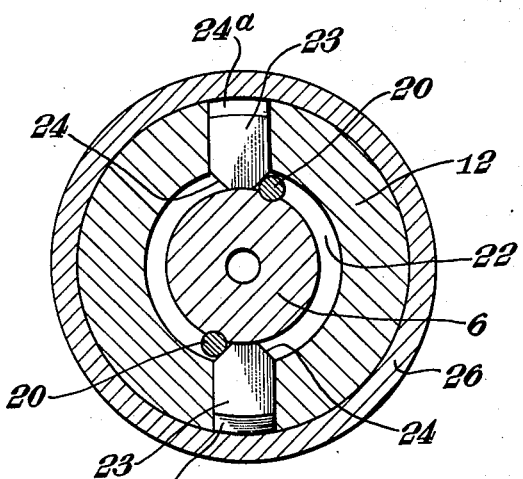
FIG. 4 is a section of FIG. 2 taken on the dotted line 4—4
Figure 5:
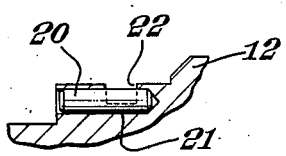
FIG. 5 is a scrap section

The exemplary form of roll clutch is shown in FIG. 3 as comprising a pair of diametrically opposite grooves 30 in the socketed head of the carrier 6, and a coacting pair of pockets 32 in the tool holder 12 which are of the stepped type containing balls 34. Said balls engage in the stepped portions of said pockets to lock the tool holder to the chuck to effect the unscrewing of the tool. The further pair of pockets 36 are used for threading work with a lefthand tap in place of a right-hand one. It will be understood that the roll clutch does not form a part of my invention, and that other known types of roll clutches may be used, such as that disclosed in my earlier Patent No. 2,591,291.

It will be appreciated that the invention above described provides a very reliable, simple and easily manufactured construction of clutch which is capable of withstanding normal usage over a substantial period of use, whereas, when requiring servicing, it will be but a simple task to dismantle worn and substitute new rollers.

The invention is not to be regarded as being limited to the details of construction above described by way of example, since modifications may be made without departing from the basic ideas of the invention as defined by the appended claim.

The advantages and utility of the invention will be evident from the preceding description and it will be understood that such changes and variations may be resorted to as fairly come within the scope of the appended claim.

What I claim is:

A releasing tap and die holder assembly comprising an elongated tool holder having a cylidrical stem integral with an increased-diameter, annular mounting portion and a terminal socket portion, said annular mounting portion forming an annular thrust shoulder opposite said socket portion, said mounting portion including a pair of diametrically opposed, blind bore portions radially spaced and parallel to the longitudinal axis of said tool holder, said mounting portion including a circumferential groove intersecting and communicating with said blind bore portions; roller elements freely journaled in said blind bore portions for rotation about their longitudinal axes, and having a peripheral portion extending into said circumferential groove; a tool holder carrier including a sleeve journaled on said cylindrical stem and having an internal recess conforming to the outer periphery of said mounting portion and forming an internal shoulder abutting said thrust shoulder of said tool holder and retaining said roller elements in said blind bores; said holder carrier including diametrically opposed, radial apertures communicating with the circumferential groove on said mounting portion; dog elements reciprocally supported in said diametrically disposed radial apertures and having an inner end portion extendible into the circumferential groove and engageable with the peripheral portion of said roller elements exposed therein; and a shift member supported for longitudinal movement on said tool holder carrier sleeve and including a collar portion engageable with outer end portions of said dog elements for urging said dog elements into said circumferential groove to permit torque to be transmitted between said tool holder and tool holder carrier.

References Cited in the file of this patent

UNITED STATES PATENTS

| | | |
|---|---|---|
| 1,702,132 | Redinger | Feb. 12, 1929 |
| 2,253,491 | Bakewell | Aug. 26, 1941 |
| 2,450,238 | Jordan | Sept. 28, 1948 |
| 2,591,291 | Raymond | Apr. 1, 1952 |
| 2,684,491 | Roddick | July 27, 1954 |

FOREIGN PATENTS

| | | |
|---|---|---|
| 538,607 | Canada | Mar. 26, 1957 |